United States Patent
Zhou et al.

(10) Patent No.: US 11,838,906 B2
(45) Date of Patent: Dec. 5, 2023

(54) DYNAMIC POWER SHARING ENHANCEMENT

(71) Applicant: AT&T Intellectual Property I, L.P., Atlanta, GA (US)

(72) Inventors: Jianchun Zhou, Bellevue, WA (US); Wen Yang, Bellevue, WA (US); Yakun Gao, Suwanee, GA (US); Ye Chen, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 261 days.

(21) Appl. No.: 17/235,045

(22) Filed: Apr. 20, 2021

(65) Prior Publication Data
US 2022/0338198 A1    Oct. 20, 2022

(51) Int. Cl.
| H04W 72/044 | (2023.01) |
| H04W 72/0446 | (2023.01) |
| H04W 72/21 | (2023.01) |
| H04W 72/56 | (2023.01) |
| H04W 52/14 | (2009.01) |
| H04W 52/28 | (2009.01) |

(52) U.S. Cl.
CPC ..... *H04W 72/0473* (2013.01); *H04W 52/146* (2013.01); *H04W 52/281* (2013.01); *H04W 72/0446* (2013.01); *H04W 72/21* (2023.01); *H04W 72/56* (2023.01)

(58) Field of Classification Search
None
See application file for complete search history.

(56) References Cited

U.S. PATENT DOCUMENTS

| 2021/0211988 A1* | 7/2021 | Jung | H04W 52/346 |
| 2021/0377884 A1* | 12/2021 | Lee | H04W 92/18 |
| 2022/0210743 A1* | 6/2022 | Yi | H04W 52/16 |

* cited by examiner

*Primary Examiner* — Walter J Divito
(74) *Attorney, Agent, or Firm* — GUNTIN & GUST, PLC; Kenneth Kwan (57) ABSTRACT

A method, system, computer readable storage medium, or apparatus provides for receiving a first message from a user equipment (UE), wherein the first message comprises an indication of one or more conditions, wherein the one or more conditions comprises an indication that the UE has a radio mode that comprises new radio (NR); determining a required idle period for long term evolution (LTE) for the UE; determining, based on the first message and the required idle period for LTE, a transmission time interval (TTI) for NR that corresponds to the required idle period for LTE; and sending, to the UE, a second message, wherein the second message comprises an indication of the TTI for NR.

20 Claims, 9 Drawing Sheets

FIG. 11

DYNAMIC POWER SHARING ENHANCEMENT

BACKGROUND

Carrier aggregation has allowed operators to tap into noncontiguous blocks of licensed spectrum, as well as unlicensed frequencies like the 5 GHz band, to create bigger data bites and significantly improve long-term evolution (LTE) coverage. Fifth generation (5G) networks (also referred herein as new radio—NR), which were designed from the ground up to support all manner of spectrum aggregation and sharing, are today tightly linked to LTE networks and a technology called dual connectivity is allowing operators to supercharge non-standalone NR.

Non-standalone NR networks rely on an LTE core and radio access network with the addition of a 5G carrier whereas standalone NR is built on a whole new core and RAN.

Dual connectivity is not to be confused with dynamic spectrum sharing (DSS), which allows operators to provide LTE and NR in the same spectrum at the same time. In dual connectivity, the handset is separately receiving LTE and NR signals then aggregating the streams.

This background information is provided to reveal information believed by the applicant to be of possible relevance. No admission is necessarily intended, nor should be construed, that any of the preceding information constitutes prior art.

SUMMARY

A dynamic power sharing system to prioritize first radio uplink common channels power utilization over second radio uplink shared channel power.

In an example, a method, system, computer readable storage medium, or apparatus provides for receiving a message from a user equipment (UE), wherein the message includes an indication of one or more conditions of the UE, wherein the one or more conditions includes an indication that the UE has radio mode that includes new radio (NR) and long-term evolution (LTE), and a threshold power level has been reached; based on the indication of one or more conditions of the UE, selecting a power priority scheme in which NR physical uplink control channel (PUCCH) communication is assigned more power than LTE physical uplink shared channel (PUSCH) communication and NR PUSCH communication; and sending, to the UE, a command message, wherein the command message includes an indication of the power priority scheme.

In an example, a method, system, computer readable storage medium, or apparatus provides for receiving a message from a user equipment (UE), wherein the message includes an indication of one or more conditions, wherein the one or more conditions includes an indication that the UE has radio mode that is attached to long term evolution (LTE) and ready to add new radio (NR) leg; based on the indication of one or more conditions of the UE, selecting a scheduling priority scheme in which LTE scheduling is skipped to give the UE dedicated slot to perform Random Access (RACH) on NR physical random access channel (PRACH); and sending, to the UE, a command message, wherein the command message includes an indication of the scheduling priority scheme.

In an example, a method, system, computer readable storage medium, or apparatus provides for receiving a message from a user equipment (UE), wherein the message includes an indication of one or more conditions of the UE, wherein the one or more conditions of the UE includes an indication that the UE has radio mode that includes new radio (NR) and long-term evolution (LTE), and a threshold power level has been reached; based on the indication of one or more conditions of the UE, selecting a scheduling priority scheme in which LTE physical uplink shared channel (PUSCH) communication and NR PUSCH communication alternate time slots; and sending, to the UE, a command message, wherein the command message includes an indication of the scheduling priority scheme.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

In EUTRA-NR Dual Connectivity (EN-DC) architecture, both NR and LTE are allowed to transmit and receive data at the same time to boost downlink and uplink throughput. However, one of the challenges in particular user equipment (UE) uplink is how the total sum of combined transmit power of NR and LTE is conventionally limited by a configured maximum power, which is dependent on UE capability. For example, even when LTE and NR scheduling is separated and they are splitting the bearer, transmission power calculation may still need to be considered jointly between different radios to meet this limitation and optimize performance. Dynamic Power Sharing (DPS) scheme shares the power between LTE and NR when either of them needs more power. For Power Class 3 UE, as an example, the maximum output power of each LTE and NR is limited to 22 dBm to constrain the maximum total output power to ≤25 dBm. But 22 dbm LTE is less than LTE ONLY, with a single uplink power limitation of 23 dbm to 25 dbm (2 db margin from 3GPP for peak variation). Conventionally, DPS's principal is that when LTE requires power higher than 22 dbm, NR power needs to be reduced to fulfill LTE's required power up to 25 dbm, while not exceeding the maximum total power limitation. This is a requirement because LTE carries the critical signaling, and the network expects no impact for the coverage of EN-DC architecture at cell edge.

A further drawback of conventional dynamic power sharing is the LTE required power is mainly calculated from number of radio block (RB) and path loss. When the number of RB is large (for example at 10 Mhz bandwidth, the number of RB is 50) even if the radio condition is very good at −90 dbm, LTE's required power will be larger than 22 dbm, so NR will not have any power room to be added since all of power is assigned to LTE. Therefore, the NR resource can't be utilized even if NR coverage is available. Additionally, during connected mode with dual connection, the NR radio link is unstable since NR power is dropped when the LTE required transmit power is more than 22 dbm.

The disclosed subject matter provides a method to enhance the current DPS algorithm in order to differentiate the power reduction priority for PUCCH/PRACH (Physical Uplink Control Channel/Physical Random Access Channel) and PUSCH (Physical Uplink Shared Channel). In particular, NR PUCCH/PRACH power may not be reduced even when the power is being limited. Technical effects of the disclosed subject matter may include increasing NR accessibility and retainability, decreasing NR radio link failures, and utilizing NR radio resource at cell edge.

Figure 1:
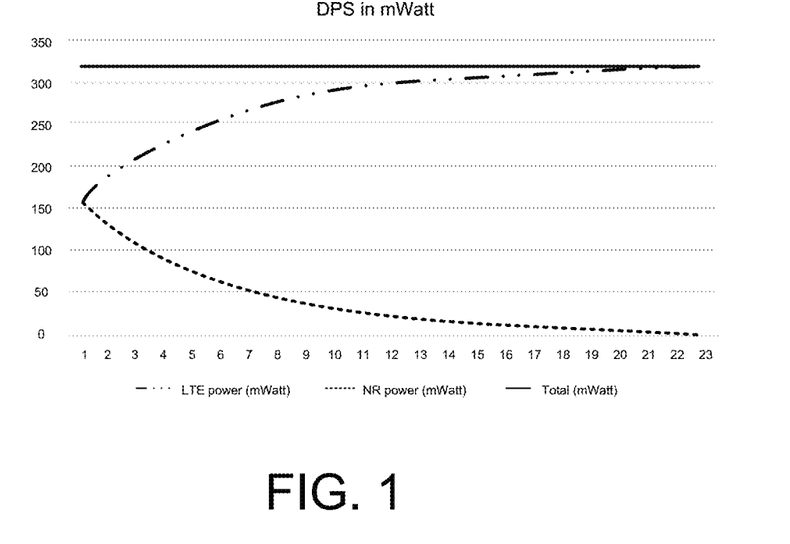
FIG. 1 illustrates DPS in mWatt for LTE/NR.
Figure 2:
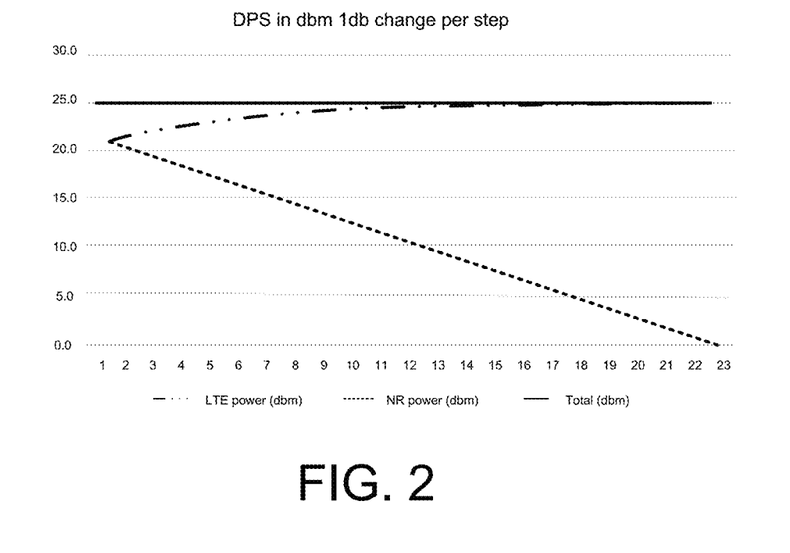
FIG. 2 illustrates conventional DPS in dbm 1 db change per step for LTE/NR.

For additional perspective, FIG. 1 illustrates conventional DPS in mWatt for LTE/NR and FIG. 2 illustrates conventional DPS in dbm 1 db change per step for LTE/NR. As discussed, the current DPS algorithm involves general power sharing between LTE and NR, it does not distinguish LTE and NR PUCCH/PRACH and PUSCH. When LTE required power exceeds 22 dbm, NR power has to be reduced sharply to guarantee LTE radio link, which largely impacts NR DL (down link) performance since PUCCH is in charge of the critical messages for PDSCH feedback and radio condition reporting.

Table 1 provides an examples of failures using the conventional method. When LTE carries large UL traffic or at cell edge, LTE utilizes all available power. So, NR cannot be added since NR PRACH power cannot be boosted, causing PRACH failures. As shown in the below table, the LTE required power is more than 22 dbm, the PRACH did not have enough power and failed after 10 attempts.

2020 Aug. 3 21:25:10.549 [85]
0xB88A NR5G MAC RACH Attempt

Num Attempt = 1 to 10
RACH Result = FAILURE_MSG2_RA_TIMER_EXP

TABLE 1

| Attempt # | System Time Frame | Sub Frame | Slot | Symbol Start | Prach Config | Preamble Format | Ra ID | FDM | Uroot | Cyclic Shift V | RA RNTI |
|---|---|---|---|---|---|---|---|---|---|---|---|
| 1 | 969 | 4 | 0 | 0 | 17 | FORMAT_0 | 8 | 0 | 810 | 119 | 57 |
| 2 | 971 | 4 | 0 | 0 | 17 | FORMAT_0 | 14 | 0 | 24 | 0 | 57 |
| 3 | 973 | 4 | 0 | 0 | 17 | FORMAT_0 | 1 | 0 | 29 | 119 | 57 |
| 4 | 975 | 4 | 0 | 0 | 17 | FORMAT_0 | 4 | 0 | 29 | 476 | 57 |
| 5 | 977 | 4 | 0 | 0 | 17 | FORMAT_0 | 0 | 0 | 29 | 0 | 57 |
| 6 | 979 | 4 | 0 | 0 | 17 | FORMAT_0 | 5 | 0 | 29 | 595 | 57 |
| 7 | 981 | 4 | 0 | 0 | 17 | FORMAT_0 | 13 | 0 | 810 | 714 | 57 |
| 8 | 983 | 4 | 0 | 0 | 17 | FORMAT_0 | 4 | 0 | 29 | 476 | 57 |
| 9 | 985 | 4 | 0 | 0 | 17 | FORMAT_0 | 13 | 0 | 810 | 714 | 57 |
| 10 | 987 | 4 | 0 | 0 | 17 | FORMAT_0 | 10 | 0 | 810 | 357 | 57 |

2020 Aug. 3 21:25:10.653 [51]
0xB88A NR5G MAC RACH Attempt

RACH Result = ABORTED

Figure 3:
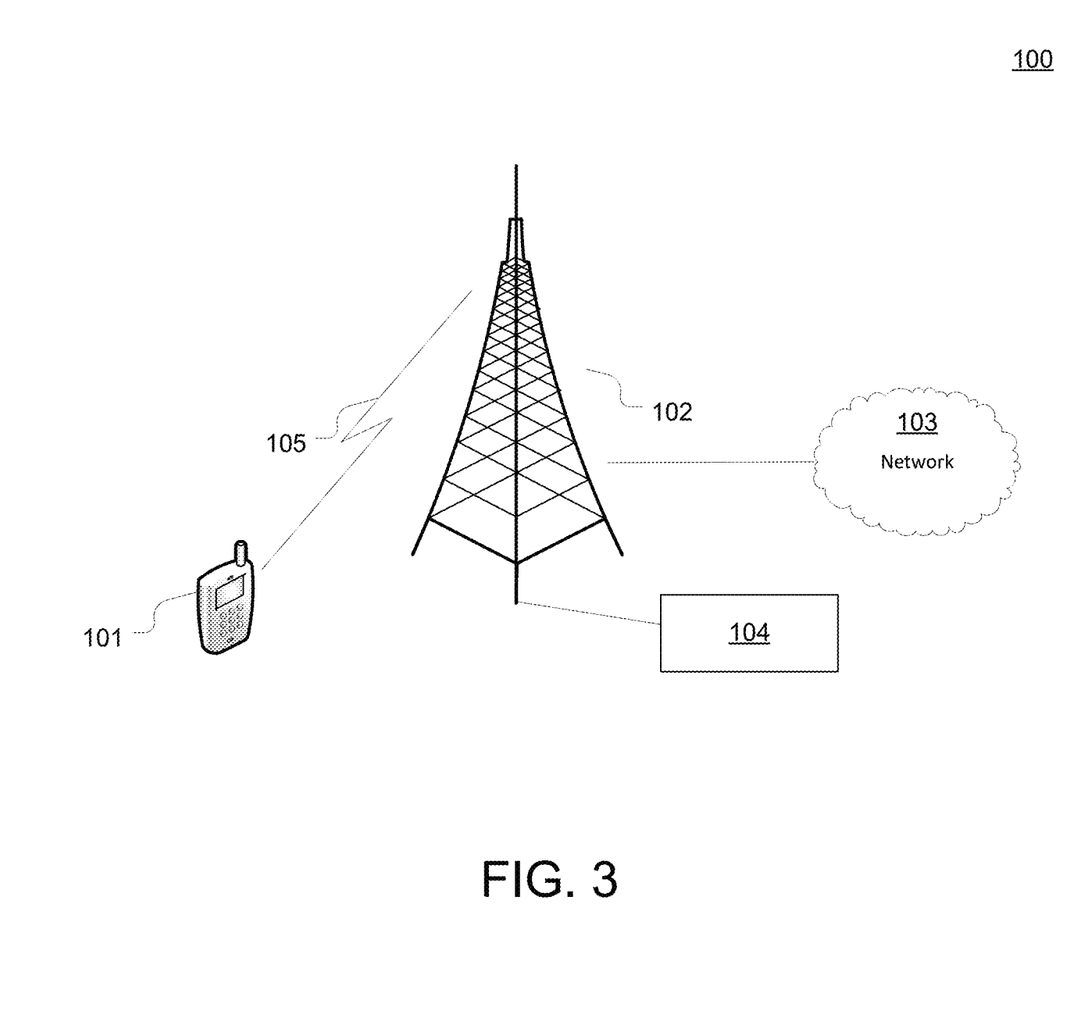
FIG. 3 illustrates an exemplary system that may implement dynamic power sharing enhancement.

FIG. 3 illustrates an exemplary system that may implement dynamic power sharing enhancement, as disclosed herein. System 100 may include use equipment (UE) 101, server 104 that may be communicatively connected via network 103 and base station 102. Server 104 or UE 101 may include virtual machines. Server 104 may be integrated into base station 102 or be a separate physical device or virtual device. Each device in system 100 may be communicatively connected with each other. Server 104 may receive information about connection 105 or the aspects of system 100.

The disclosed subject matter provides a system to prioritize NR uplink common channels power utilization over LTE uplink shared channel power in a way that may improve NR accessibility and sustainability. LTE would be the primary (master) link with RRC signaling, while NR would be a secondary link. If the primary (master) link changes to NR in future EN-DC architecture, then the system may switch "LTE" to "NR".

Approach A and Approach C below may apply to UL carrier aggregation when UL has two carriers, LTE is the primary cell, and NR is the secondary cell.

Figure 4:
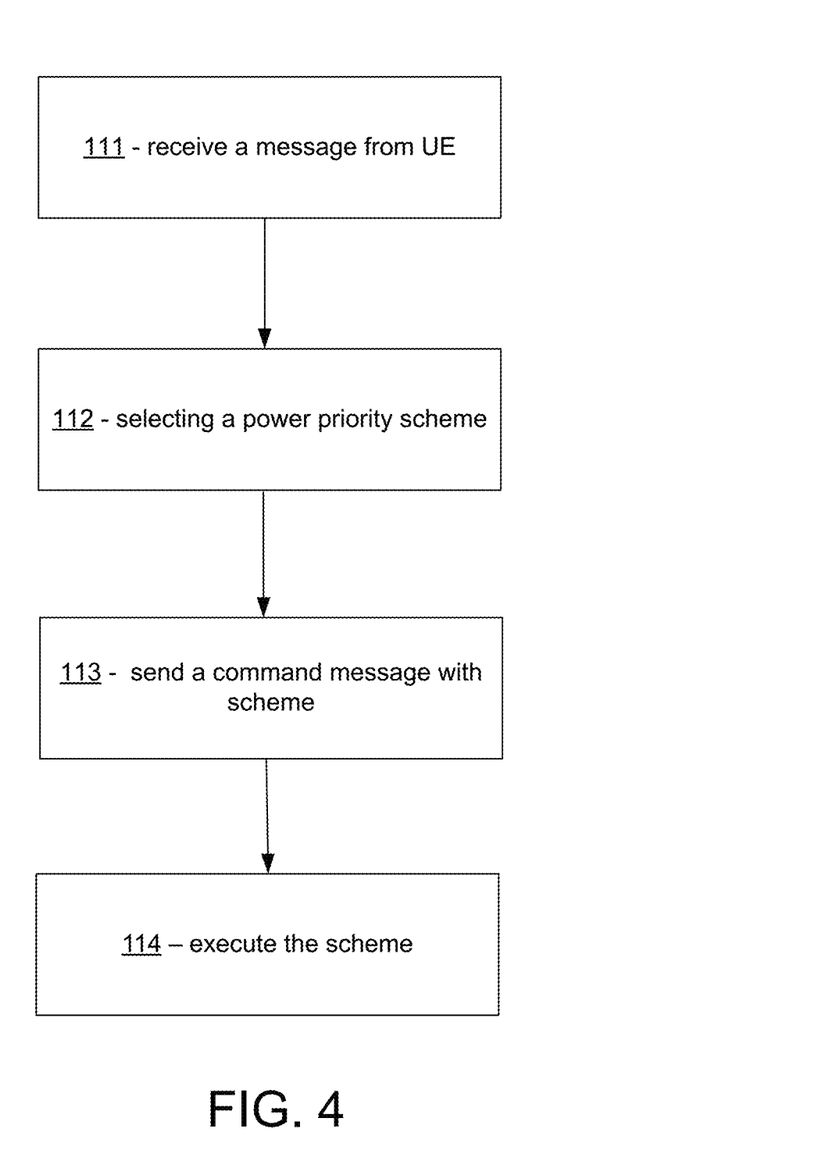
FIG. 4 illustrates an example of an Approach A for dynamic power enhancement.

FIG. 4 illustrates an example of an Approach A for dynamic power enhancement. At step 111, server 104, may receive a message from UE 101. The message of step 111 may include an indication of one or more conditions associated with UE 101. The one or more conditions may include an indication that UE 101 has a radio mode that includes new radio (NR) and long-term evolution (LTE) or a threshold power level has been reached. The threshold power level may be based on power head room. Power head room (PHR) is maximum power minus the actual transmitting power. At step 112, in response to the indication of one or more conditions associated with UE 101, selecting a power priority scheme in which NR physical uplink control channel (PUCCH) communication is assigned more power than LTE physical uplink shared channel (PUSCH) communication and NR PUSCH communication. This Approach A separates the PUSCH and PUCCH power for dynamic power control between LTE and NR and sets the following example priority list to protect PUCCH and improve NR performance when the total power is limited. The priority list may include the following: 1) Priority #1: LTE PUCCH; 2) Priority #2: NR PUCCH; 3) Priority #3: LTE PUSCH; and 4) Priority #4: NR PUSCH.

At step 113, sending, to UE 101, a command message. The command message may include an indication of the power priority scheme selected at step 112. At step 114, UE 101 executes the priority scheme.

Figure 5:
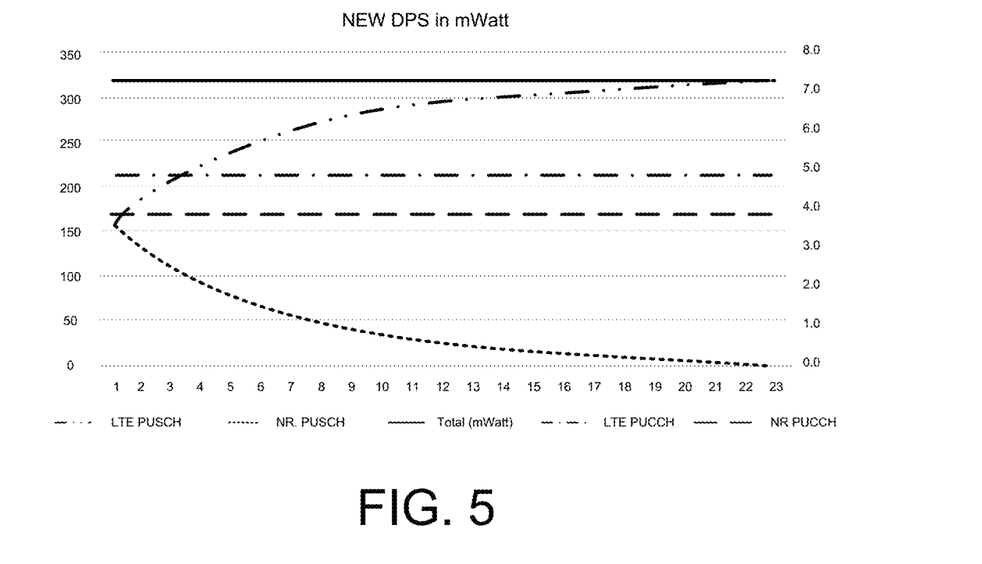
FIG. 5 illustrates new DPS in mWatt for LTE/NR.
Figure 6:
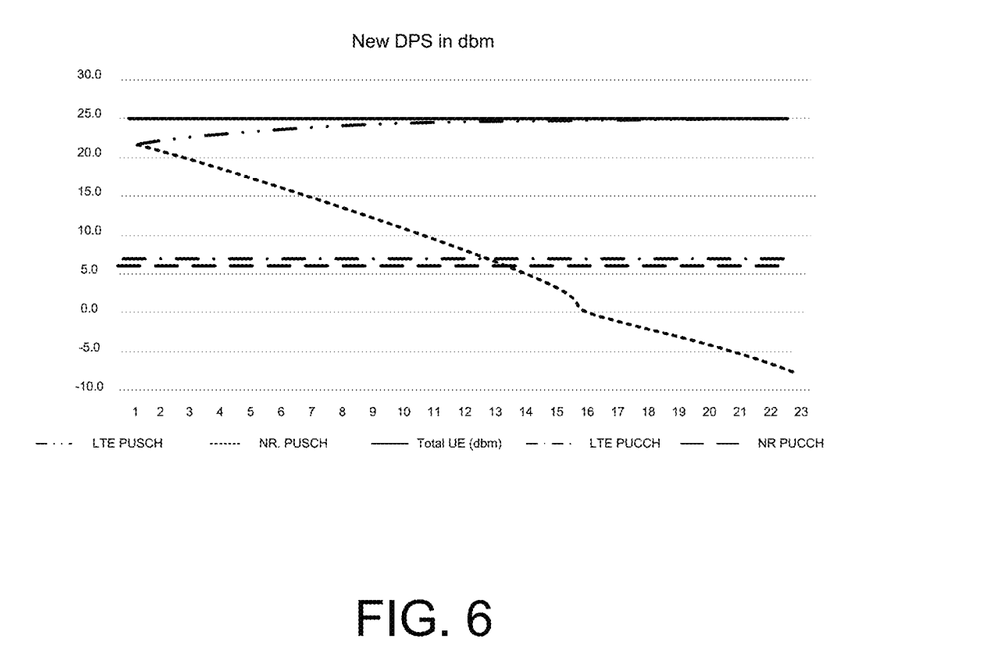
FIG. 6 illustrates new DPS in dbm 1 db change per step for LTE/NR.

FIG. 5 illustrates new DPS in mWatt for LTE/NR and FIG. 6 illustrates new DPS in dbm 1 db change per step for LTE/NR. Note: The PUCCH power is 6 dbm, it is equivalent as 23 dbm PUSCH with 50 PRB since PUCCH has 1 PRB.

Figure 7:
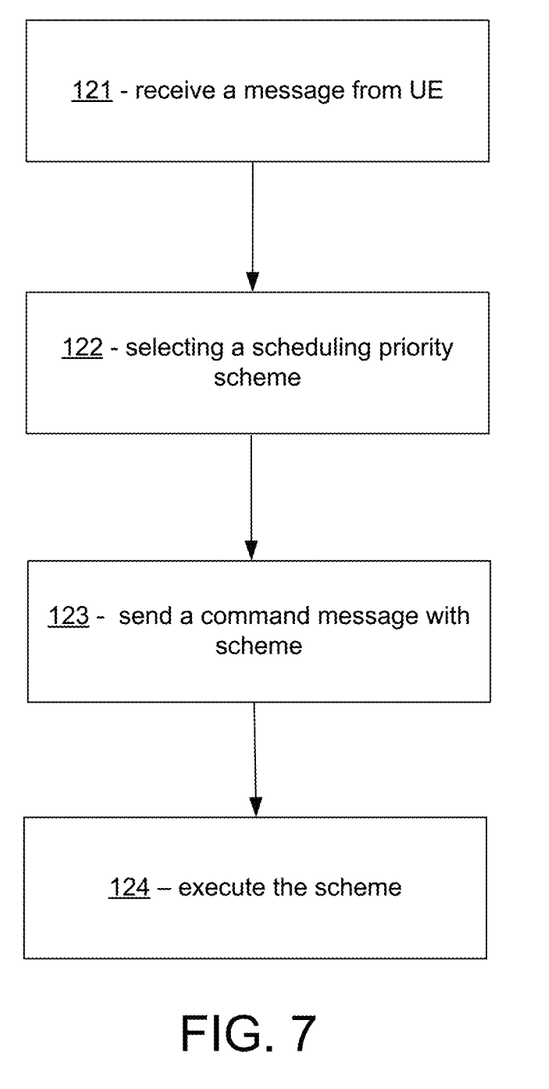
FIG. 7 illustrates an example of an Approach B for dynamic power enhancement.
Figure 8:
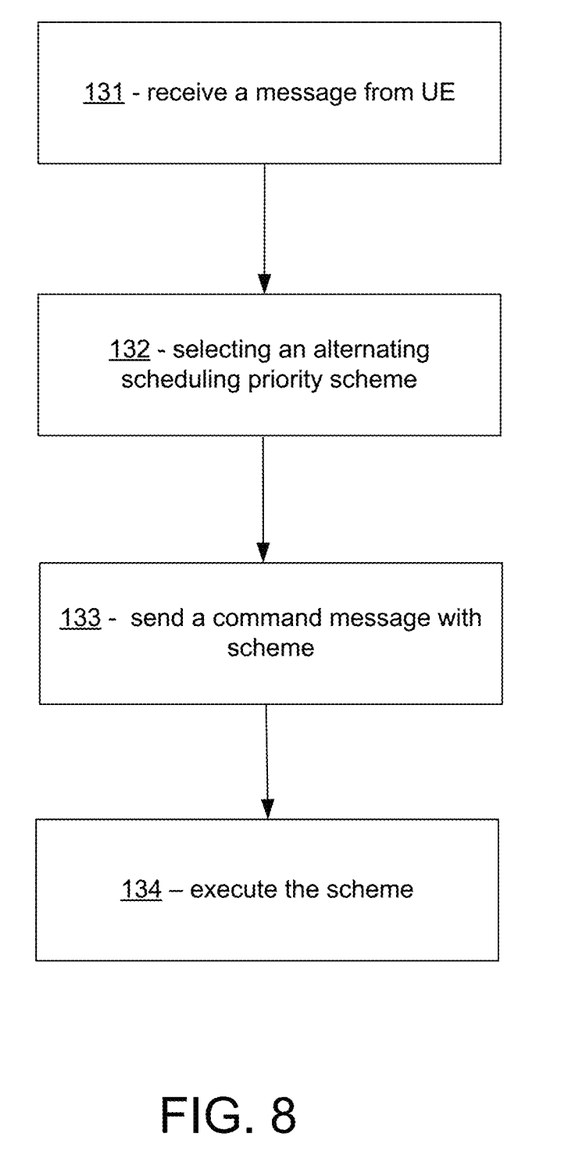
FIG. 8 illustrates an example of an Approach C for dynamic power enhancement.

FIG. 7 illustrates an example of an Approach B for dynamic power enhancement. At step 121, server 104, may receive a message from UE 101. The message may include an indication of one or more conditions. The one or more conditions may include an indication that UE 101 has a radio mode that is attached to LTE and indication that UE 101 is ready to add a NR leg. Ready to add may mean when NR Reference Signal Received Power (RSRP) reaches the NR quality threshold, for example, −115 dbm RSRP is normal threshold. At step 122, in response to the indication of the one or more conditions associated with UE 101, selecting a scheduling priority scheme in which LTE scheduling is skipped to give UE 101 a dedicated slot to perform Random Access (RACH) on NR physical random access channel (PRACH). In an example, with reference to Table 2, in which the LTE slot is skipped for NR PRACH and NR is indicated as the highest priority for the slot. For example, if config PRACH index is 17, slot-4 may always be assigned to NR PRACH at every 20 ms at odd system frame. Note the slot is transmission time interval (TTI slot), the minimum time unit for scheduling. The selected schedule indicates skipping the LTE slot or indicates that NR is allocated all the power for the corresponding slot. In this case, LTE will miss 1 of 20 slots which incurs a 5% impact, compared to if NR PRACH fails, which may lead to up to a 50% impact.

an indication that UE 101 has a radio mode that includes new radio (NR) and long-term evolution (LTE) or a threshold power level has been reached. At step 132, in response to the indication of one or more conditions associated with UE 101, selecting a scheduling priority scheme (see Table 3) in which in which LTE physical uplink shared channel (PUSCH) communication and NR PUSCH communication alternate time slots. The threshold power level (e.g., limited power) may trigger aforementioned alternative scheduling between LTE and NR. This Approach C may allow for 50% slot utilization for each radio, but overall still having 100% utilization. With single radio link with above 22 dbm power, Approach C may improve UL spectrum efficiency by using high modulation scheme. The Approach C may leave another 50% of slots for neighbor users to improve spectrum efficiency and reduce the inter-user, inter-RAT interference. Neighbor users mean another UE, when the serving user skips the slots, the neighbor users can use these slots, that is why it may be 50% if serving user skip 50% of slots.

TABLE 3

| TTI slot | 1 | 2 | 3 | 4 | 5 | 6 | 7 | 8 | 9 | 10 |
|---|---|---|---|---|---|---|---|---|---|---|
| LTE PUSCH scheduling | No | Yes | No | Yes | No | Yes | No | Yes | No | Yes |
| NR PUSCH scheduling | Yes | No | Yes | No | Yes | No | Yes | No | Yes | No |

At step 133, sending, to UE 101, a command message. The command message may include an indication of the scheduling priority scheme selected at step 132. At step 134, UE 101 executes the priority scheme.

Technical effects of the disclosed dynamic power sharing enhancement, when compared to conventional methods, may include improved DPS and UL CA performance when power is limited, spectrum efficiency, or an improvement in UE battery life. Dynamic power sharing enhancement may improve NR accessibility by sparing power for NR PRACH when conflicting with LTE. Having constant high PUCCH power may significantly improve NR performance. Without this technology, power-limited DPS may be degraded, underperform, and frequently lose NR radio link. Alternate scheduling between LTE and NR may lift the power limitation bar, improving EN-DC coverage and end user experience at cell edge. It is contemplated herein that there can be switching between approaches. For example, Approach A can switch to Approach C when reaching a threshold high UL traffic volume, for example 10 Mbps, or switch back to Approach A when reaching a threshold low traffic volume.

TABLE 2

| | System Frame-subframe | | | | | | | | | |
|---|---|---|---|---|---|---|---|---|---|---|
| | 1-4 | 3-4 | 5-4 | 7-4 | 9-4 | 11-4 | 13-4 | 15-4 | 17-4 | 19-4 |
| LTE PUSCH scheduling | No | No | No | No | No | No | No | No | No | No |
| NR PRACH Scheduling | Yes | Yes | Yes | Yes | Yes | Yes | Yes | Yes | Yes | Yes |

At step 123, sending, to UE 101, a command message. The command message may include an indication of the scheduling priority scheme of step 122. At step 124, UE 101 executes the priority scheme.

Figure 9:
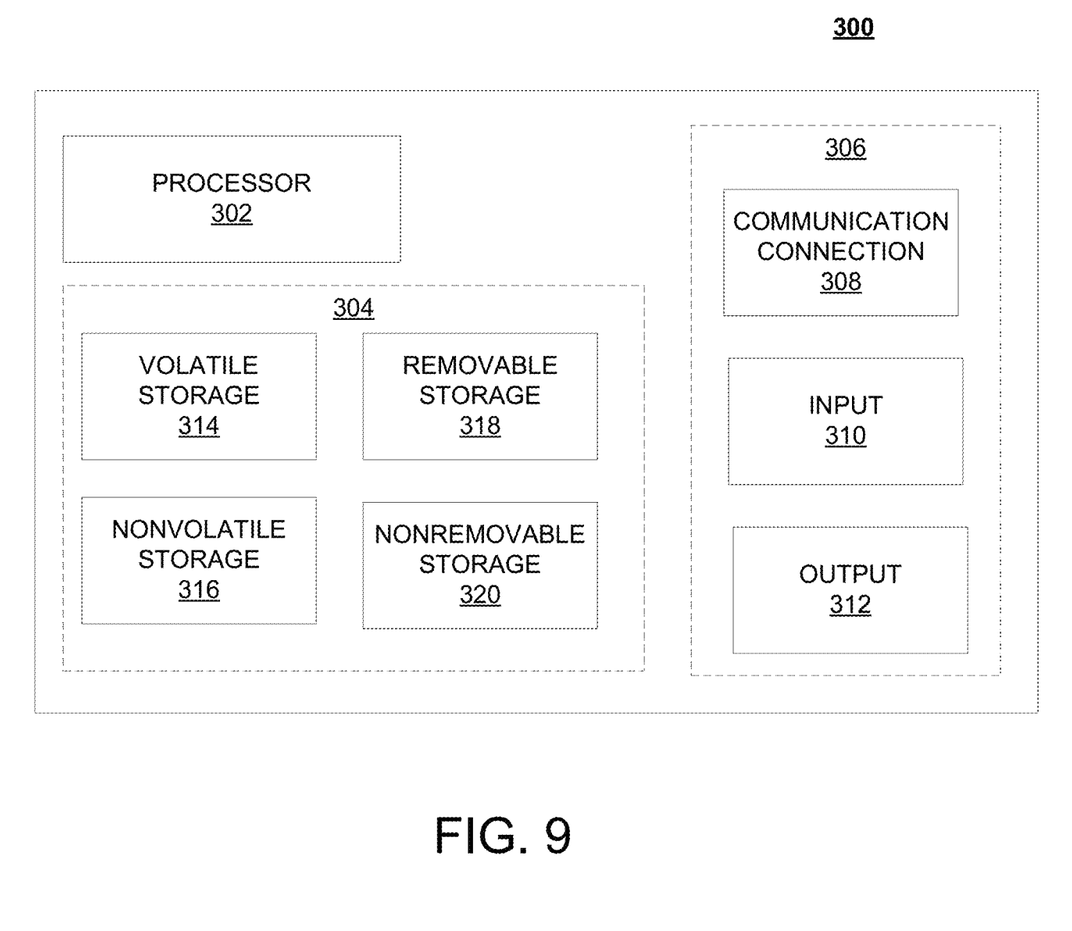
FIG. 9 illustrates a schematic of an exemplary network device.

FIG. 8 illustrates an example of an Approach C for dynamic power enhancement. At step 131, server 104, may receive a message from UE 101. The message of step 111 may include an indication of one or more conditions associated with UE 101. The one or more conditions may include FIG. 9 is a block diagram of network device 300 that may be connected to or comprise a component of system 100 or other systems disclosed herein. Network device 300 may comprise hardware or a combination of hardware and software. The functionality to facilitate telecommunications via a telecommunications network may reside in one or combination of network devices 300. Network device 300 depicted in FIG. 9 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 9 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 9) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 10:
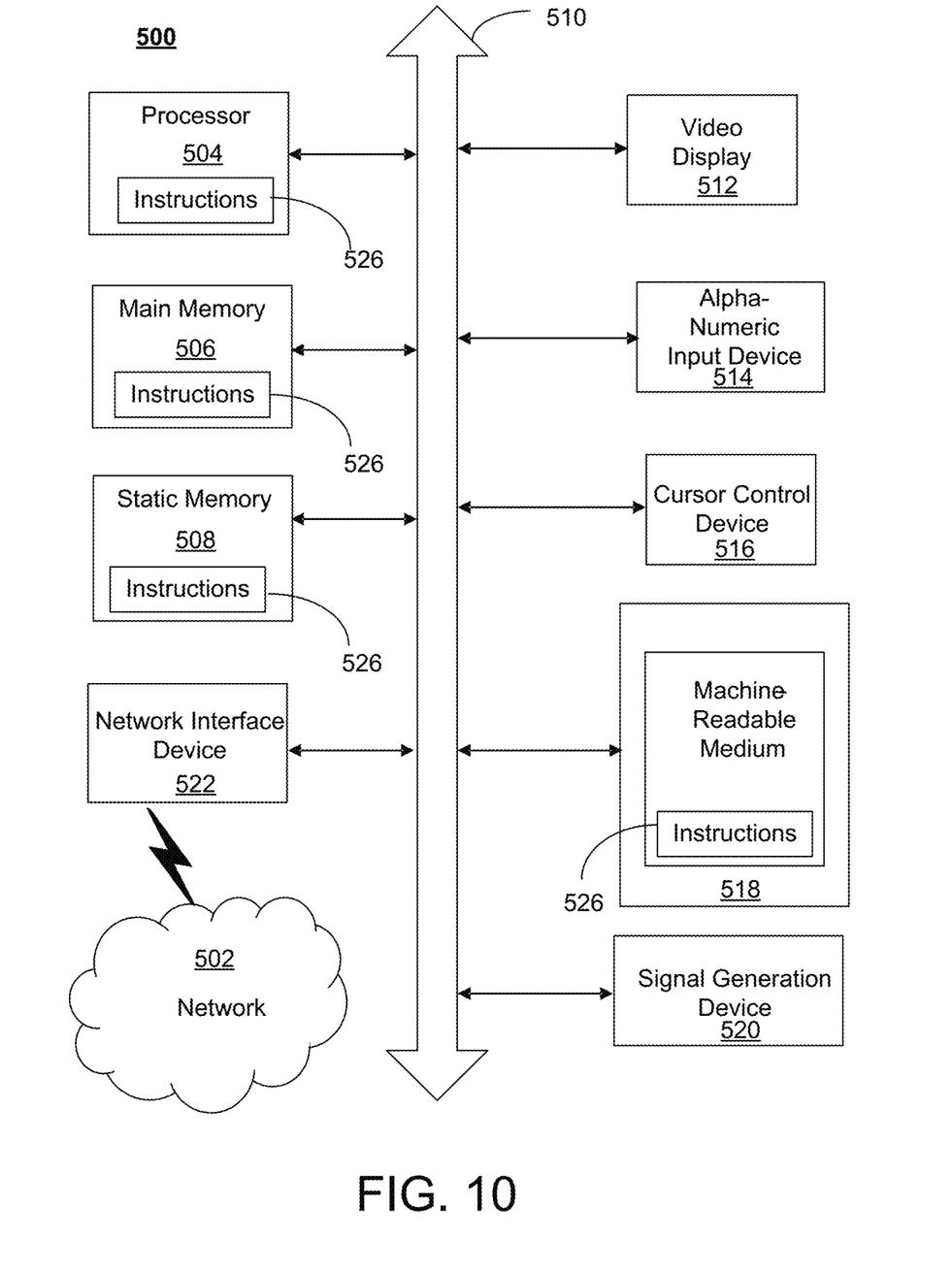
FIG. 10 illustrates an exemplary communication system that provides wireless telecommunication services over wireless communication networks.

FIG. 10 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 101, server 104, base station 102, and other disclosed devices. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 11:
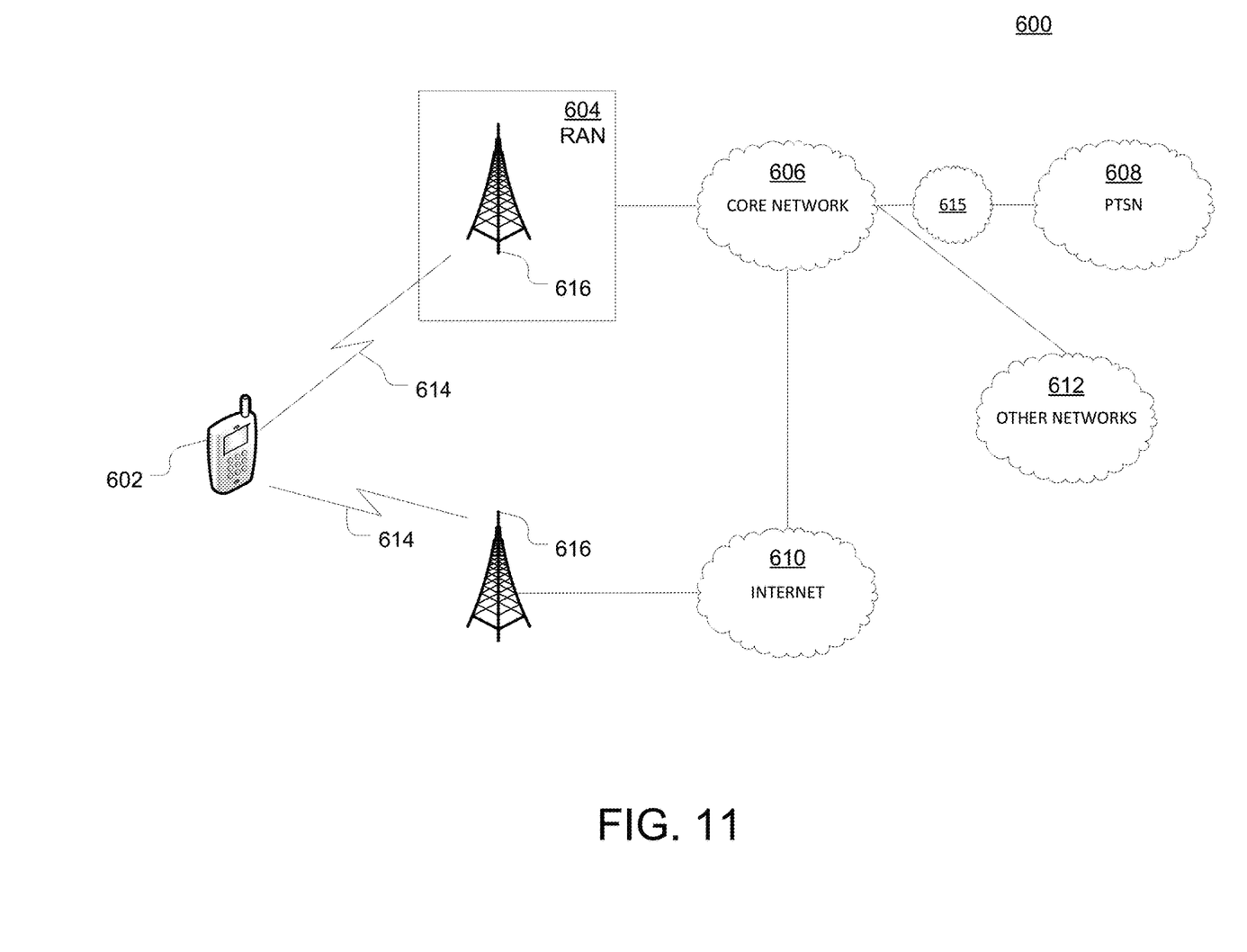
FIG. 11 illustrates an exemplary telecommunications system in which the disclosed methods and processes may be implemented.

As shown in FIG. 11, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU (e.g., UE) may comprise drone 102, a mobile device, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, g Node B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE, new radio (NR), or the like.

Optionally base station 616 and WTRUs 602 connected to RAN 604 may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 802.11 to establish a wireless local area network (WLAN). As another example, base station 616 and associated WTRUs 602 may implement a radio technology such as IEEE 802.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 11, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 11, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which dynamic power sharing enhancement alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine become a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine become a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—dynamic power sharing enhancement—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for dynamic power sharing enhancements. Note although LTE and NR are referenced herein, it is contemplated that other radio modes may use the approaches herein. A method, system, computer readable storage medium, or apparatus provides for receiving a first message from a user equipment (UE), wherein the first message comprises an indication of one or more conditions, wherein the one or more conditions comprises an indication that the UE has radio modes that comprises a first radio mode or a second radio mode; determining a required idle period for a first radio mode for the UE; determining, based on the first message and the required idle period for the first radio mode, a transmission time interval (TTI) for the second radio mode that corresponds to the required idle period for the first radio mode; and sending, to the UE, a second message, wherein the second message comprises an indication of the TTI for the second radio mode. A method, system, computer readable storage medium, or apparatus provides for receiving a first message from a user equipment (UE), wherein the first message comprises an indication of one or more conditions, wherein the one or more conditions comprises an indication that the UE has a radio mode that comprises new radio (NR); determining a required idle period for long term evolution (LTE) for the UE; determining, based on the first message and the required idle period for LTE, a transmission time interval (TTI) for NR that corresponds to the required idle period for LTE; and sending, to the UE, a second message, wherein the second message comprises an indication of the TTI for NR. A method, system, computer readable storage medium, or apparatus provides for receiving a first message from a user equipment (UE), wherein the first message comprises an indication of one or more conditions of the UE, wherein the one or more conditions comprises an indication that the UE has radio mode that comprises new radio (NR) or long-term evolution (LTE); based on the indication of one or more conditions of the UE, selecting a priority scheme in which NR physical uplink control channel (PUCCH) communication is prioritized over LTE physical uplink shared channel (PUSCH) communication and NR PUSCH communication; and sending, to the UE, a second message, wherein the second message comprises an indication of the priority scheme. A method, system, computer readable storage medium, or apparatus provides for receiving a first message from a user equipment (UE), wherein the first message comprises an indication of one or more conditions of the UE, wherein the one or more conditions of the UE comprises: one or more radio modes of the UE that comprises new radio (NR) or long-term evolution (LTE), or the like, and a threshold power level has been reached; based on the indication of one or more conditions of the UE, selecting a scheduling scheme in which LTE physical uplink shared channel (PUSCH) communication and NR PUSCH communication alternate time slots; and sending, to the UE, a second message, wherein the second message comprises an indication of the priority scheme. All combinations in this paragraph and the following paragraph (including the removal or addition of steps) are contemplated in a manner that is consistent with the other portions of the detailed description.

A method, system, computer readable storage medium, or apparatus provides for receiving a message from a user equipment (UE), wherein the message comprises an indication of one or more conditions of the UE, wherein the one or more conditions comprises an indication that the UE has radio mode that comprises a first radio mode (e.g., new radio (NR)) and a second radio mode (e.g., long-term evolution (LTE)), and a threshold power level has been reached; based on the indication of one or more conditions of the UE, selecting a power priority scheme in which the first radio mode physical uplink control channel (PUCCH) communication is assigned more power than the second radio mode (e.g., LTE) physical uplink shared channel (PUSCH) communication and the first radio mode PUSCH communication; and sending, to the UE, a command message, wherein the command message comprises an indication of the power priority scheme. A method, system, computer readable storage medium, or apparatus provides for receiving a message from a user equipment (UE), wherein the message comprises an indication of one or more conditions, wherein the one or more conditions comprises an indication that the UE has radio mode that is attached to long term evolution (LTE) and ready to add new radio (NR) leg; based on the indication of one or more conditions of the UE, selecting a scheduling priority scheme in which LTE scheduling is skipped to give the UE dedicated slot to perform Random Access (RACH) on NR physical random access channel (PRACH); and sending, to the UE, a command message, wherein the command message comprises an indication of the scheduling priority scheme. A method, system, computer readable storage medium, or apparatus provides for receiving a message from a user equipment (UE), wherein the message comprises an indication of one or more conditions of the UE, wherein the one or more conditions of the UE comprises an indication that the UE has radio mode that comprises new radio (NR) and long-term evolution (LTE), and a threshold power level has been reached; based on the indication of one or more conditions of the UE, selecting a scheduling priority scheme in which LTE physical uplink shared channel (PUSCH) communication and NR PUSCH communication alternate time slots; and sending, to the UE, a command message, wherein the command message comprises an indication of the scheduling priority scheme. Further comprising UE executing the priority scheme (e.g., power or schedule). The scheduling priority scheme indicates dedicated slots for the UE to perform Random Access (RACH) on NR physical random access channel (PRACH). The scheduling priority scheme may indicate that the LTE PUSCH is of a higher priority than the NR PUSCH, that schedules more slots to LTE when LTE has larger buffer. The scheduling priority scheme may indicate that the NR PUSCH is of a higher priority than the LTE PUSCH, that schedule more slots to NR when NR has larger buffer. All combinations in this paragraph and the previous paragraph (including the removal or addition of steps) are contemplated in a manner that is consistent with the other portions of the detailed description.

What is claimed:
1. A method comprising:
receiving a message from a user equipment (UE), wherein the message includes an indication of one or more conditions of the UE, and wherein the one or more conditions includes an indication that the UE has a radio mode that includes new radio (NR) and long-term evolution (LTE), and a threshold power level has been reached;
based on the indication of the one or more conditions of the UE, selecting a power priority scheme in which NR physical uplink control channel (PUCCH) communication is assigned more power than LTE physical uplink shared channel (PUSCH) communication and NR PUSCH communication; and
sending, to the UE, a command message, wherein the command message includes an indication of the power priority scheme.

2. The method of claim 1, wherein the power priority scheme indicates that the LTE PUCCH is of a higher priority than the NR PUCCH.

3. The method of claim 1, wherein the power priority scheme indicates that the LTE PUSCH is of a higher priority than the NR PUSCH.

4. The method of claim 1, wherein the power priority scheme indicates that the NR PUCCH is of a higher priority than the NR PUSCH.

5. The method of claim 1, wherein the power priority scheme indicates that the NR PUCCH is of a higher priority than the LTE PUSCH.

6. The method of claim 1, wherein the command message is broadcast to a plurality of UEs that have the same model number or other identifier.

7. The method of claim 1, further comprising executing the power priority scheme by the UE.

8. A device, comprising:
a processing system including a processor; and
a memory that stores executable instructions that, when executed by the processing system, facilitate performance of operations, the operations comprising:
obtaining a message from a user equipment (UE), wherein the message includes an indication of one or more conditions of the UE, and wherein the one or more conditions includes an indication that the UE has a radio mode that includes new radio (NR) and long-term evolution (LTE), and a threshold power level has been reached;
based on the indication of the one or more conditions of the UE, selecting a power priority scheme in which NR physical uplink control channel (PUCCH) communication is assigned more power than LTE physical uplink shared channel (PUSCH) communication and NR PUSCH communication; and
sending, to the UE, a command message, wherein the command message includes an indication of the power priority scheme.

9. The device of claim 8, wherein the power priority scheme indicates that LTE PUCCH is of a higher priority than the NR PUCCH.

10. The device of claim 8, wherein the power priority scheme indicates that the LTE PUSCH is of a higher priority than the NR PUSCH.

11. The device of claim 8, wherein the power priority scheme indicates that the NR PUCCH is of a higher priority than the NR PUSCH.

12. The device of claim 8, wherein the power priority scheme indicates that the NR PUCCH is of a higher priority than the LTE PUSCH.

13. The device of claim 8, wherein the command message is broadcast to a plurality of UEs that have the same model number or other identifier.

14. The device of claim 8, wherein the power priority scheme is executed by the UE.

15. A non-transitory machine-readable medium, comprising executable instructions that, when executed by a processing system including a processor, facilitate performance of operations, the operations comprising:
receiving a message from a user equipment (UE), wherein the message includes an indication of one or more conditions of the UE, and wherein the one or more conditions includes an indication that the UE has a radio mode that includes new radio (NR) and long-term evolution (LTE), and a threshold power level has been reached;
based on the indication of the one or more conditions of the UE, selecting a power priority scheme in which NR physical uplink control channel (PUCCH) communication is assigned more power than LTE physical uplink shared channel (PUSCH) communication and NR PUSCH communication; and
providing a command message for the UE, wherein the command message includes an indication of the power priority scheme.

16. The non-transitory machine-readable medium of claim 15, wherein the power priority scheme indicates that LTE PUCCH is of a higher priority than the NR PUCCH.

17. The non-transitory machine-readable medium of claim 15, wherein the power priority scheme indicates that the LTE PUSCH is of a higher priority than the NR PUSCH.

18. The non-transitory machine-readable medium of claim 15, wherein the power priority scheme indicates that the NR PUCCH is of a higher priority than the NR PUSCH.

19. The non-transitory machine-readable medium of claim 15, wherein the power priority scheme indicates that the NR PUCCH is of a higher priority than the LTE PUSCH.

20. The non-transitory machine-readable medium of claim 15, wherein the command message is broadcast to a plurality of UEs that have the same model number or other identifier.

* * * * *